United States Patent
Chen et al.

(10) Patent No.: US 12,411,030 B2
(45) Date of Patent: Sep. 9, 2025

(54) FORWARD AND REVERSE BIDIRECTIONAL FLOW RATE MEASUREMENT METHOD FOR SUBSEA CHEMICAL AGENT INJECTION DEVICE

(71) Applicants: CNOOC (CHINA) CO., LTD, Tianjin (CN); CNOOC CHINA LIMITED, HAINAN BRANCH, Haikou (CN); HAIMO SUBSEA TECHNOLOGY (SHANGHAI) CO., LTD., Shanghai (CN)

(72) Inventors: Haodong Chen, Haikou (CN); Xiaowei Ma, Shanghai (CN); Chunmin Zeng, Haikou (CN); Guangfu Li, Shanghai (CN); Anchao Wei, Haikou (CN); Yanzhi Pan, Shanghai (CN); Ming Luo, Haikou (CN); Tan Xiao, Haikou (CN); Donglei Jiang, Haikou (CN); Huan Diao, Haikou (CN)

(73) Assignees: CNOOC (CHINA) CO., LTD, Tianjin (CN); CNOOC CHINA LIMITED, HAINAN BRANCH, Haikou (CN); HAHAIMO SUBSEA TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 19/112,278

(22) PCT Filed: Aug. 27, 2024

(86) PCT No.: PCT/CN2024/114663
§ 371 (c)(1),
(2) Date: Mar. 17, 2025

(87) PCT Pub. No.: WO2025/021225
PCT Pub. Date: Jan. 30, 2025

(65) Prior Publication Data
US 2025/0258026 A1   Aug. 14, 2025

(30) Foreign Application Priority Data
Sep. 28, 2023   (CN) ........................ 202311271924.0

(51) Int. Cl.
*G01F 1/36* (2006.01)
*F17D 3/12* (2006.01)
*F17D 3/18* (2006.01)

(52) U.S. Cl.
CPC ............... *G01F 1/363* (2013.01); *F17D 3/18* (2013.01); *F17D 3/12* (2013.01)

(58) Field of Classification Search
CPC ............... G01F 1/363; F17D 3/18; F17D 3/12
See application file for complete search history.

(56) References Cited

U.S. PATENT DOCUMENTS

| | | | | |
|---|---|---|---|---|
| 10,704,488 B2 * | 7/2020 | Marchi | ............... | F02D 41/2467 |
| 2005/0224593 A1 * | 10/2005 | Cibotti | ................ | F02M 61/042 239/5 |

(Continued)

FOREIGN PATENT DOCUMENTS

| CN | 107701925 A |   | 2/2018 |
|---|---|---|---|
| CN | 110709587 A | * | 1/2020 |

(Continued)

*Primary Examiner* — Shelby A Turner
*Assistant Examiner* — Yaritza H Perez Bermudez
(74) *Attorney, Agent, or Firm* — Bayramoglu Law Offices LLC

(57) ABSTRACT

A forward and reverse bidirectional flow rate measurement method for a subsea chemical agent injection device is provided. The device includes a device body, a flow channel is formed inside the device body, the device body includes an agent input connector, a pressure reduction member, a needle valve assembly, and an agent output connector that are sequentially communicated through the flow channel; and the method is implemented by: calibrating forward and reverse flow of agents at different openings and flow rates, (Continued)

then obtaining differential pressures before and after the agents flow through the needle value assembly; fitting relationships between the flow rates and the differential pressures at different openings to obtain a plurality of arrays of opening-flow coefficients; then fitting relationships between the flow coefficients and the needle valve openings to establish a formula for the flow rate and the opening-differential pressure, and finally performing the measurement in real time.

9 Claims, 4 Drawing Sheets

(56) References Cited

U.S. PATENT DOCUMENTS

2016/0153412 A1* 6/2016 Thibault .............. F02M 51/061
239/533.3

2021/0402364 A1* 12/2021 Demmitt .................. C07H 1/00
2022/0010647 A1 1/2022 Clunie et al.
2024/0102436 A1* 3/2024 Niethammer ........ F02M 61/168

FOREIGN PATENT DOCUMENTS

| CN | 113375061 A | | 9/2021 | |
|---|---|---|---|---|
| CN | 113775931 A | | 12/2021 | |
| CN | 217177431 U | * | 8/2022 | |
| CN | 107701925 B | * | 10/2023 | ............... F17D 3/18 |
| CN | 117289728 A | * | 12/2023 | ........... G05D 7/0635 |
| CN | 117367519 A | * | 1/2024 | ............... G01F 1/34 |
| KR | 20180019134 A | * | 2/2018 | ............... G21C 1/02 |
| WO | WO-2025021225 A9 | * | 5/2025 | |

* cited by examiner

FORWARD AND REVERSE BIDIRECTIONAL FLOW RATE MEASUREMENT METHOD FOR SUBSEA CHEMICAL AGENT INJECTION DEVICE

CROSS REFERENCE TO THE RELATED APPLICATIONS

This application is the national phase entry of International Application No. PCT/CN2024/114663, filed on Aug. 27, 2024, which is based upon and claims priority to Chinese Patent Application No. 202311271924.0, filed on Sep. 28, 2023, the entire contents of which are incorporated herein by reference.

TECHNICAL FIELD

The present disclosure relates to the field of petroleum engineering, and particularly relates to a chemical agent injection control method for a subsea Christmas tree network.

BACKGROUND

In order to ensure the normal operation of a subsea oil pipeline, and improve the service life and production efficiency of the subsea oil pipeline, it is necessary to inject various agents into the pipeline through a subsea injection device at regular intervals. Regarding the subsea injection device, the Chinese Patent Application (Application No.: CN202110934610.9) previously submitted by the applicant provides a structure of a subsea agent injection device, which indicates that an orifice plate and a flow channel groove can reduce a pressure of the high-pressure agent flowing through the device. However, the following problems were discovered in subsequent practice:

(1) since an original pipeline of a subsea Christmas tree is not correctly installed, an inlet of the subsea agent injection device is connected to a corresponding outlet of the Christmas tree, and an outlet of the subsea agent injection device is connected to a corresponding inlet of the Christmas tree; since relevant parameters of the subsea agent injection device are calibrated in advance based on a default state that the agent would flow in a forward direction inside the subsea agent injection device, an incorrect installation of the original pipeline will cause the agent to flow in a reverse direction inside the device, which further results in mismatch of parameters, preventing accurate measurement of the agent flow rate, in which case, it is necessary to pause the injection of the agent into the subsea agent injection device, to reinstall the device in a correct direction, resulting in an increase in the installation costs, and affecting the operation and maintenance of a pipeline network. In order to prevent similar situations from occurring in the future, it is necessary to calibrate relevant parameters of the forward and reverse flows of the agent that is injected into the subsea agent injection device, such that the forward and reverse flows of the agent can be accurately measured.

(2) For the purpose of controlling flow stability, designers introduced a needle valve to control a flow rate of the agent. However, when a needle value opening is different, relevant flow rate parameters will also change, therefore, it is impossible to measure the flow rate with fixed parameters. Thus, it is necessary to establish a relationship between flow rate and valve opening, so as to accurately measure the flow rate in real time.

SUMMARY

In order to solve the above technical problems, the present disclosure mainly adopts the following technical solution:

A forward and reverse bidirectional flow rate measurement method for a subsea chemical agent injection device, including a device body, where a flow channel is formed inside the device body, the device body includes an agent input connector, a pressure reduction member, a needle valve assembly, and an agent output connector that are sequentially communicated through the flow channel:

step 1: keeping an opening V of the needle valve assembly fixed, taking the agent input connector and the agent output connector as inlets to inject agents with different calibrated flow rates Q into the device body for forward and reverse bidirectional calibration, and synchronously obtaining first differential pressures DP1 before and after the chemical agent flows through the pressure reduction member, and second differential pressures DP2 before and after the chemical agent flows through the needle valve assembly during a period; and obtaining a forward calibration array and a reverse calibration array for the opening V;

step 2. fitting relationships between flow rates and differential pressures in forward and reverse directions at the same opening V according to Formula (1):

$$\begin{cases} Q_A = K_A * \sqrt{DPn_A} + C_A \\ Q_B = K_B * \sqrt{DPn_B} + C_B \end{cases} \quad \text{Formula ①}$$

in the formula:

$Q_A$ is a forward flow rate; $K_A$ is a forward flow coefficient; $C_A$ is a forward calibration coefficient; $DPn_A$ is either $DP1_A$ or $DP2_A$, $DP1_A$ is a forward first differential pressure, and $DP2_A$ is a forward second differential pressure; and $Q_B$ is a reverse flow rate; $K_B$ is a reverse flow coefficient; $C_B$ is a reverse calibration coefficient; $DPn_B$ is either $DP1_B$ or $DP2_B$, $DP1_B$ is a reverse first differential pressure, and $DP2_B$ is a reverse second differential pressure;

step 3. adjusting the needle valve assembly (5) to different openings V, and repeating the steps 1 and 2 to obtain forward and reverse flow coefficients, as well as forward and reverse calibration coefficients at the different openings, respectively;

a forward opening $V_A$, the forward flow coefficient $K_A$, and the forward calibration coefficient $C_A$ correspond to each other and form a forward fitting array;

a reverse opening $V_B$, the reverse flow coefficient $K_B$, and the reverse calibration coefficient $C_B$ correspond to each other and form a reverse fitting array;

step 4. fitting relationships between flow coefficients and needle valve openings according to Formula ②:

$$\begin{cases} K_A = f(V_A) \\ K_B = f(V_B) \end{cases} \quad \text{Formula ②}$$

step 5. establishing a formula of flow rate, opening and differential pressure according to Formula ③:

$$\begin{cases} Q_A = f(V_A) * \sqrt{DPn_A} + \overline{C_A} \\ Q_B = f(V_B) * \sqrt{DPn_B} + \overline{C_B} \end{cases} \quad \text{Formula ③}$$

in the formula:

$\overline{C_A}$ is an average of a plurality of forward calibration coefficients $C_A$; and $\overline{C_B}$ is an average of a plurality of reverse calibration coefficients $C_B$.

step 6. connecting the device body to a production system and injecting a chemical agent;

when a pressure of the chemical agent shows a decline trend from the pressure reduction member to the needle valve assembly, it is determined that the chemical agent flows in the forward direction; and a real-time forward opening of the needle valve assembly is controlled to $V_A'$, a real-time forward first differential pressure $DP1_A'$ and a real-time forward second differential pressure $DP2_A'$ are obtained, and a real-time forward flow rate $Q_A'$ is then calculated according to Formula ④:

$$Q_A'=f(V_A)*\sqrt{DPn_A'}+\overline{C_A}, \quad \text{Formula ④};$$

where $DPn_A'$ is either $DP1_A'$ or $DP2_A'$;

when a pressure of the chemical agent shows an increase trend from the pressure reduction member to the needle valve assembly, it is determined that the chemical agent flows in the reverse direction; and a real-time reverse opening of the needle valve assembly is controlled to $V_B'$, a real-time reverse first differential pressure $DP1_B'$ and a real-time reverse second differential pressure $DP2_B'$ are obtained, and a real-time reverse flow rate $Q_B'$ is then calculated according to Formula ⑤:

$$Q_B'=f(V_B)*\sqrt{DPn_B'}+\overline{C_B}, \quad \text{Formula 5.}$$

Using the above technical solution, the agent input connector and the agent output connector are used as inlets to introduce the agent in an initial stage, forward and reverse flow of the agent inside the device body is simulated, relevant coefficients/parameters are calibrated separately to obtain calculation formulae for the forward and reverse flow rates, and the corresponding calculation formula is then selected according to the forward or reverse flow of the agents to obtain the real-time flow rate, thereby solving the problem of inaccurate measurement caused by the inaccurate unidirectional calibration of parameters. In addition, the above method directly fits the relationship between the flow rate, differential pressure, and opening. In actual application, the real-time flow rate can be obtained based on the real-time opening and differential pressure, thereby solving the problems of slow and inaccurate measurement.

DETAILED DESCRIPTION OF THE EMBODIMENTS

The present disclosure will be further described below with reference to the embodiments and the accompanying drawings.

Example 1

Figure 1:
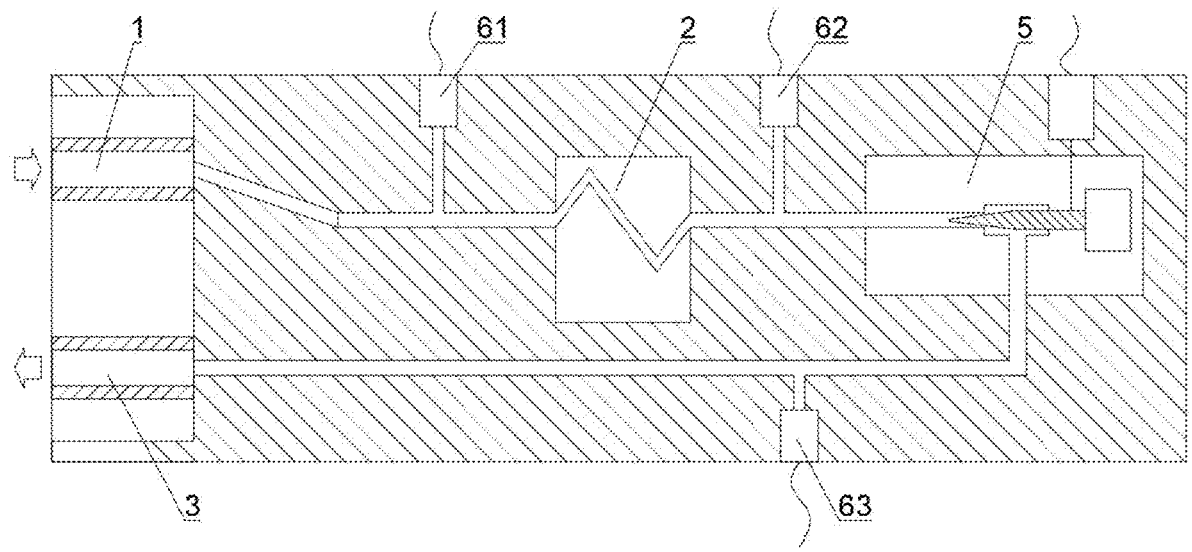
FIG. 1 is a structural schematic diagram of a subsea agent injection device according to the present disclosure.

A forward and reverse bidirectional flow rate measurement method for a subsea chemical agent injection device, including a device body, as shown in FIG. 1, where a flow channel is formed inside the device body, the device body includes an agent input connector 1, a pressure reduction member 2, a needle valve assembly 5, and an agent output connector 3 that are sequentially communicated through the flow channel;

the device body further includes a first pressure sensor 61, a second pressure sensor 62 and a third pressure sensor 63;

a pressure detection end of the first pressure sensor 61 is connected to the flow channel at an upstream end of the pressure reduction member 2 to measure a front fluid pressure P1 before the chemical agent flows through the pressure reduction member 2;

a pressure detection end of the second pressure sensor 62 is connected to the flow channel between the pressure reduction member 2 and the needle valve assembly 5 to measure a middle fluid pressure P2 after the chemical agent flows through the pressure reduction member 2 but before the chemical agent flows through the needle valve assembly 5; and a pressure detection end of the third pressure sensor 63 is connected to the flow channel at a downstream of the needle valve assembly 5 to measure a rear fluid pressure P3 after the chemical agent flows through the needle valve assembly 5.

Output terminals of the first pressure sensor 61, the second pressure sensor 62, and the third pressure sensor 63 are respectively connected to a signal processing transmission module via signal wiring harnesses.

The device body further includes a linear displacement sensor and a rotational displacement sensor, sensing terminals of the linear displacement sensor and the rotational displacement sensor are both connected to an opening and closing function portion of the needle valve assembly 5; and the linear displacement sensor and rotational displacement sensor are mutually redundant, such that an effective and reliable alternative can be provided despite that one position sensing method fails or becomes misaligned; and both the linear displacement sensor and the rotational displacement sensor are configured to measure a position of the opening and closing function portion of the needle valve assembly 5 (such as, a valve needle/valve stem), thereby obtaining the needle valve opening.

The prior art provides methods for calculating the need valve opening, which will not be elaborated herein.

The method is implemented according to the following steps:

step 1: keeping an opening V of the needle valve assembly 5 fixed, taking the agent input connector 1 and the agent output connector 3 as inlets to inject agents with different calibrated flow rates Q into the device body for forward and reverse bidirectional calibration, and synchronously obtaining first differential pressures DP1 before and after the chemical agent flows through the pressure reduction member 2, and second differential pressures DP2 before and after the chemical agent flows through the needle valve assembly 5 during the period;

DP1=|P1-P2|;

DP2=|P2-P3|;

a forward calibration array and a reverse calibration array for the same opening V are accordingly obtained; where the forward calibration array includes a plurality of forward calibration flow rates, a forward first differential pressure, and a forward second differential pressure; and the reverse calibration array includes a plurality of reverse calibration flow rates, a reverse first differential pressure, and a reverse second differential pressure;

step 2. fitting relationships between flow rates and differential pressures in forward and reverse directions at the same opening V according to Formula 1) based on the forward calibration array and the reverse calibration array:

$$\begin{cases} Q_A = K_A * \sqrt{DPn_A} + C_A \\ Q_B = K_B * \sqrt{DPn_B} + C_B \end{cases} ; \quad \text{Formula ①}$$

in the formula:

$Q_A$ is a forward flow rate; $K_A$ is a forward flow coefficient; $C_A$ is a forward calibration coefficient; $DPn_A$ is either $DP1_A$ or $DP2_A$, $DP1_A$ is a forward first differential pressure, and $DP2_A$ is a forward second differential pressure; and $Q_B$ is a reverse flow rate; $K_B$ is a reverse flow coefficient; $C_B$ is a reverse calibration coefficient; $DPn_B$ is either $DP1_B$ or $DP2_B$, $DP1_B$ is a reverse first differential pressure, and $DP2_B$ is a reverse second differential pressure;

step 3. adjusting the needle valve assembly 5 to different openings V, and repeating the steps 1 and 2 to obtain forward and reverse flow coefficients, as well as forward and reverse calibration coefficients at the different openings, respectively;

a forward opening $V_A$, the forward flow coefficient $K_A$, and the forward calibration coefficient $C_A$ correspond to each other and form a forward fitting array;

a reverse opening $V_B$, the reverse flow coefficient $K_B$, and the reverse calibration coefficient $C_B$ correspond to each other and form a reverse fitting array;

the steps 2 and 3 are combined and can also be directly expressed by as the following formula:

$$\begin{cases} Q_A = K_A * \sqrt{DPn_A} + C_A = \begin{cases} Q_{A1} = K_{A1} * \sqrt{DPn_{A1}} + C_{A1}, & V = V_{A1} \\ Q_{A2} = K_{A2} * \sqrt{DPn_{A2}} + C_{A2}, & V = V_{A2} \\ \cdots \\ Q_{Ai} = K_{Ai} * \sqrt{DPn_{Ai}} + C_{Ai}, & V = V_{Ai} \\ \cdots \\ Q_{Aj} = K_{Aj} * \sqrt{DPn_{Aj}} + C_{Aj}, & V = V_{Aj} \end{cases} \\ Q_B = K_B * \sqrt{DPn_B} + C_B = \begin{cases} Q_{B1} = K_{B1} * \sqrt{DPn_{B1}} + C_{B1}, & V = V_{B1} \\ Q_{B2} = K_{B2} * \sqrt{DPn_{B2}} + C_{B2}, & V = V_{B2} \\ \cdots \\ Q_{Br} = K_{Br} * \sqrt{DPn_{Br}} + C_{Br}, & V = V_{Br} \\ \cdots \\ Q_{Bk} = K_{Bk} * \sqrt{DPn_{Bk}} + C_{Bk}, & V = V_{Bk} \end{cases} \end{cases}$$

in the formula:

$Q_{Ai}$ is a flow rate when a forward calibration is performed at an $i^{th}$ opening;

$K_{Ai}$ is a flow coefficient when the forward calibration is performed at the $i^{th}$ opening; $DPn_{Ai}$ is either $DP1_{Ai}$ or $DP2_{Ai}$;

$DP1_{Ai}$ is a first differential pressure when the forward calibration is performed at the $i^{th}$ opening;

$DP2_{Ai}$ is a second differential pressure when the forward calibration is performed at the $i^{th}$ opening;

$C_{Ai}$ is a calibration coefficient when the forward calibration is performed at the $i^{th}$ opening;

$V_{Ai}$ is an $i^{th}$ forward opening;

i=1, 2, . . . ,j; and j is a total number of openings during the forward calibration;

$Q_{Br}$ is a flow rate when a reverse calibration is performed at an $r^{th}$ opening;

$K_{Br}$ is a flow coefficient when the reverse calibration is performed at an the $r^{th}$ opening; $DPn_{Br}$ is either $DP1_{Br}$ or $DP2_{Br}$;

$DP1_{Br}$ is a first differential pressure when the reverse calibration is performed at the $r^{th}$ opening;

$DP2_{Br}$ is a second differential pressure when the reverse calibration is performed at the $r^{th}$ opening;

$C_{Br}$ is a calibration coefficient when the reverse calibration is performed at an the $r^{th}$ opening;

$V_{Br}$ is an $r^{th}$ forward opening; and r=1, 2, . . . ,k; and k is a total number of openings during the reverse calibration;

step 4. fitting relationships between flow coefficients and needle valve openings according to Formula ②;

substituting a plurality of $K_{Ai}$ and $V_{Ai}$, and a plurality of $K_{Br}$ and $V_{Br}$ into Formula 2 to fit relationships between the forward flow coefficient and the forward opening, and relationships between the reverse flow coefficient and the reverse opening, respectively.

$$\begin{cases} K_A = f(V_A) \\ K_B = f(V_B) \end{cases} ; \quad \text{Formula ②}$$

a specific fitting formula for the flow coefficient and the needle valve opening is as follows:

$$\begin{cases} K_A = f(V_A) = A_A * V_A + D_A \\ K_B = f(V_B) = A_B * V_B + D_B \end{cases} ; \quad \text{Formula ②}$$

where $A_A$ and $D_A$ are fitting parameters of the forward opening, and $A_B$ and $D_B$ are fitting parameters of the reverse opening;

step 5. establishing a formula of flow rate, opening and differential pressure according to Formula 3:

$$\begin{cases} Q_A = f(V_A) * \sqrt{DPn_A} + \overline{C_A} \\ Q_B = f(V_B) * \sqrt{DPn_B} + \overline{C_B} \end{cases} ; \quad \text{Formula ③}$$

in the formula:

$\overline{C_A}$ is an average of a plurality of forward calibration coefficients $C_A$; and $\overline{C_B}$ is an average of a plurality of reverse calibration coefficients $C_B$; and step 6. connecting the device body to a production system and injecting a chemical agent;

when a pressure of the chemical agent shows a decline trend from the pressure reduction member 2 to the needle valve assembly 5, that is, when the front fluid pressure P1 is greater than the rear fluid pressure P3, it is determined that the chemical agent flows in the forward direction; and a real-time forward opening of the needle valve assembly 5 is controlled to $V_A'$, a real-time forward first differential pressure $DP1_A'$ and a real-time forward second differential pressure $DP2_A'$ are obtained, and a real-time forward flow rate $Q_A'$ is then calculated according to Formula ④:

$$Q_A' = f(V_A) * \sqrt{DPn_A' + \overline{C_A}}, \quad \text{Formula ④};$$

where $DPn_A'$ is either $DP1_A'$ or $DP2_A'$;

when a pressure of the chemical agent shows an increase trend from the pressure reduction member 2 to the needle valve assembly 5, that is, when the rear fluid pressure P3 is greater than the front fluid pressure P1, it is determined that the chemical agent flows in the reverse direction; and a real-time reverse opening of the needle valve assembly 5 is controlled to $V_B'$, a real-time reverse first differential pressure $DP1_B'$ and a real-time reverse second differential pressure $DP2_B'$ are obtained, and a real-time reverse flow rate $Q_B'$ is then calculated according to Formula 5; and $$Q_B' = f(V_B) * \sqrt{DPn_B' + \overline{C_B}}, \quad \text{Formula ⑤}.$$

Example 2

A forward and reverse bidirectional flow rate measurement method for a subsea chemical agent injection device is provided.

This example is substantially the same as Example 1, except that:

in the step 2, a segmented flow rate measurement value $Q_f$ is set;

in the step 6, a target flow rate $Q_m$ is set, and an opening of the needle valve assembly 5 is controlled to make $Q_A' = Q_m$ or $Q_B' = Q_m$;

when $Q_m > Q_f$, in the step 2, $DPn_A$ is set to $DP1_A$, and in the step 6, $DPn_A'$ is set to $DP1_A'$;

in the step 2, $DPn_B$ is set to $DP1_B$, and in the step 6, $DPn_B'$ is set to $DP1_B'$;

when $Q_m \leq Q_f$, in the step 2, $DPn_A$ is set to $DP2_A$, and in the step 6, $DPn_A'$ is set to $DP2_A'$; and in the step 2, $DPn_B$ is set to $DP2_B$, and in the step 6, $DPn_B'$ is set to $DP2_B$.

That is, $DP1_A'$ and $DP1_A$ have a corresponding relationship between the preceding and following equations; when a differential pressure between the forward front fluid pressure P1 and the forward middle fluid pressure P2 is fitted in the step 2, the differential pressure between the forward front fluid pressure P1 and the forward middle fluid pressure P2 should be measured in real time in the step 6;

Similarly, corresponding relationships exist between $DP1_B'$ and $DP1_B$, between $DP2_A$ and $DP2_A$, as well as between $DP2_B$ and $DP2_B$.

The segmented measurement has the effect of reducing a relative error in flow measurement, and further improving the measurement accuracy.

Example 3

A forward and reverse bidirectional flow rate measurement method for a subsea chemical agent injection device is provided, the method includes the subsea chemical agent injection device in Example 1, and is implemented by the following steps:

step 1. Bidirectional calibration step 1.1 Forward calibration:

adjusting the needle valve assembly 5 to a plurality of different forward openings $V_A$, and taking the agent input connector 1 as an inlet to inject agents with different forward flow rates $Q_A$ into the device body for calibration;

under each forward opening $V_A$ condition, the forward flow rate $Q_A$ with sufficient magnitude should be injected, preferably 10 times or more, and the forward flow rate $Q_A$ injected each time is different; a forward front fluid pressure P1, a forward middle fluid pressure P2, and a forward rear fluid pressure P3 are synchronously obtained during the process; a forward first differential pressure $DP1_A = P1-P2$, and a forward second differential pressure $DP2_A = P2-P3$;

$V_A$, $Q_A$, $DP1_A$ and $DP2_A$ correspond to one another and form a forward fitting array; and some of the forward calibration data of $V_A$, $Q_A$, $DP1_A$ and $DP2_A$ are extracted and shown in Table 1;

step 1.2 Reverse calibration:

adjusting the needle valve assembly 5 to a plurality of different reverse openings $V_B$, and taking the agent output connector 3 as an inlet to inject agents with different reverse flow rates $Q_B$ into the device body for calibration;

under each reverse opening $V_B$ condition, the reverse flow rate $Q_B$ with sufficient magnitude should be injected, preferably 10 times or more, and the reverse flow rate $Q_B$ injected each time is different; a reverse front fluid pressure P1, a reverse middle fluid pressure P2, and a reverse rear fluid pressure P3 are synchronously obtained during the process; a reverse first differential pressure $DP1_B = P2-P1$, and a reverse second differential pressure $DP2_B = P3-P2$;

$V_B$, $Q_B$, $DP1_B$ and $DP2_B$ correspond to one another and form a reverse fitting array; and some of the reverse calibration data of $V_B$, $Q_B$, $DP1_B$ and $DP2_B$ are extracted and shown in Table 2;

step 2. fitting relationships between the flow rate and the differential pressure at different openings according to the following Formula ①;

$$Q_A = K_A * \sqrt{DPn_A} + C_A = \begin{cases} Q_{A1} = K_{A1} * \sqrt{DPn_{A1}} + C_{A1}, & V = V_{A1} \\ Q_{A2} = K_{A2} * \sqrt{DPn_{A2}} + C_{A2}, & V = V_{A2} \\ \ldots \\ Q_{Ai} = K_{Ai} * \sqrt{DPn_{Ai}} + C_{Ai}, & V = V_{Ai} \\ \ldots \\ Q_{Aj} = K_{Aj} * \sqrt{DPn_{Aj}} + C_{Aj}, & V = V_{Aj} \end{cases}$$

$$Q_B = K_B * \sqrt{DPn_B} + C_B = \begin{cases} Q_{B1} = K_{B1} * \sqrt{DPn_{B1}} + C_{B1}, & V = V_{B1} \\ Q_{B2} = K_{B2} * \sqrt{DPn_{B2}} + C_{B2}, & V = V_{B2} \\ \ldots \\ Q_{Br} = K_{Br} * \sqrt{DPn_{Br}} + C_{Br}, & V = V_{Br} \\ \ldots \\ Q_{Bk} = K_{Bk} * \sqrt{DPn_{Bk}} + C_{Bk}, & V = V_{Bk} \end{cases}$$

Figure 2:
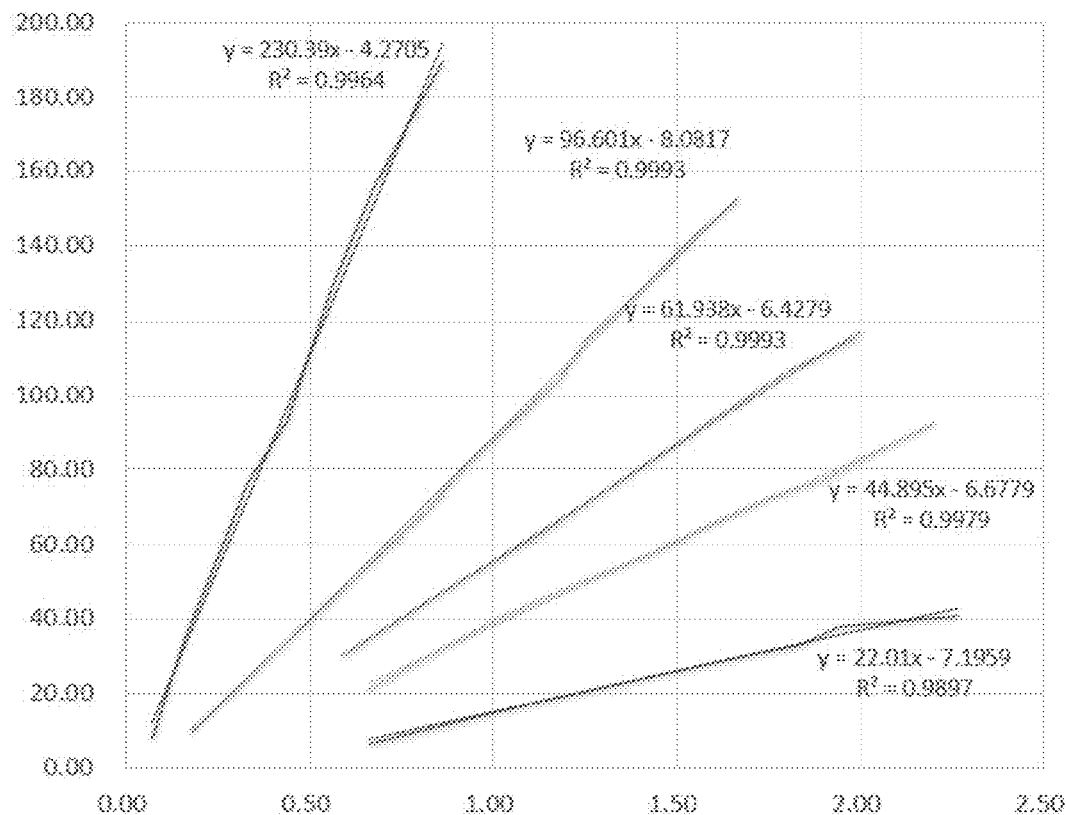
FIG. 2 shows fitting curves of forward $Q_A$-sqrt($DP2_A$) at different openings according to the present disclosure.
Figure 3:
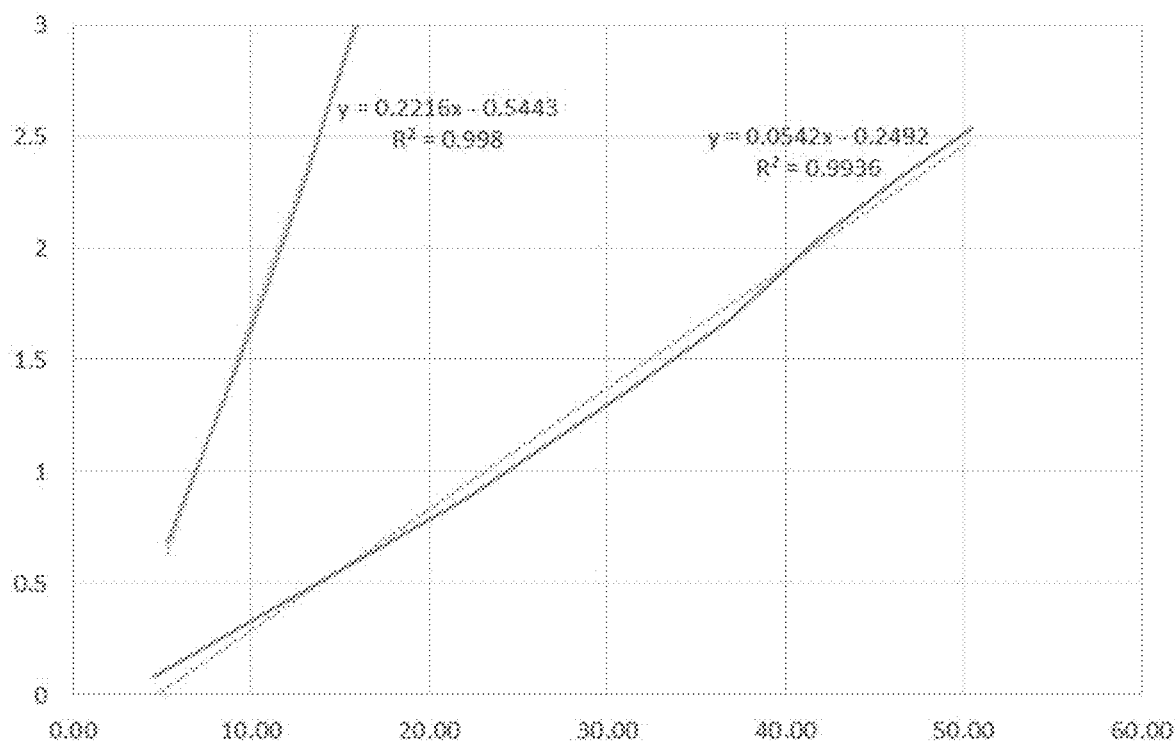
FIG. 3 shows fitting curves of reverse $Q_B$-sqrt($DP2_B$) at different openings according to the present disclosure.

Formula ① where:

$Q_A$ is composed of j $Q_{Ai}$;

$Q_{Ai}$ is a flow rate when a forward calibration is performed at an $i^{th}$ opening;

$K_A$ is a forward flow coefficient, which is composed of j $K_{Ai}$;

$K_{Ai}$ is a flow coefficient when the forward calibration is performed at the $i^{th}$ opening;

$C_A$ is a forward calibration coefficient, which is composed of j $C_{Ai}$;

$C_{Ai}$ is a calibration coefficient when the forward calibration is performed at the $i^{th}$ opening;

$DPn_A$ is composed of j $DPn_{Ai}$;

$DPn_A$ is either $DP1_A$ or $DP2_A$;

$DPn_{Ai}$ is either $DP1_{Ai}$ or $DP2_{Ai}$;

$DP1_A$ is composed of j $DP1_{Ai}$;

$DP1_{Ai}$ is a first differential pressure when the forward calibration is performed at the $i^{th}$ opening;

$DP2_A$ is composed of j $DP2_{Ai}$;

$DP2_{Ai}$ is a second differential pressure when the forward calibration is performed at the $i^{th}$ opening;

$V_A$ is composed of j $V_{Ai}$;

$V_{Ai}$ is an $i^{th}$ forward opening;

i=1, 2, . . . ,j; and j is a total number of openings during the forward calibration; $Q_B$ is composed of k $Q_{Br}$;

$Q_{Br}$ is a flow rate when a reverse calibration is performed at an $r^{th}$ opening;

$K_B$ is a reverse flow coefficient, which is composed of k $K_{Br}$;

$K_{Br}$ is a flow coefficient when the reverse calibration is performed at an the $r^{th}$ opening;

$C_B$ is a reverse calibration coefficient, which is composed of k $C_{Br}$;

$C_{Br}$ is a calibration coefficient when the reverse calibration is performed at an the $r^{th}$ opening;

$DPn_B$ is composed of k $DPn_{Br}$;

$DPn_B$ is either $DP1_B$ or $DP2_B$;

$DPn_{Br}$ is either $DP1_{Br}$ or $DP2_{Br}$; $DP1_B$ is composed of k $DP1_{Br}$;

$DP1_{Br}$ is a first differential pressure when the reverse calibration is performed at the $r^{th}$ opening;

$DP2_B$ is composed of k $DP2_{Br}$;

$DP2_{Br}$ is a second differential pressure when the reverse calibration is performed at the $r^{th}$ opening;

$V_B$ is composed of k $V_{Br}$;

$V_{Br}$ is the $r^{th}$ reverse opening;

r=1, 2, . . . ,k; and k is a total number of openings during the reverse calibration;

After the above fitting, a calibration array of the same opening is fitted to obtain a flow coefficient and a calibration coefficient, that is:

a plurality of forward openings $V_A$, forward flow coefficients $K_A$, and forward calibration coefficients $C_A$ correspond to one another and form a forward fitting array;

a plurality of reverse openings $V_B$, reverse flow coefficients $K_B$, and reverse calibration coefficients $C_B$ correspond to one another and form a reverse fitting array;

Assuming that $DPn_A$ is $DP2_A$ and $DPn_B$ is $DP2_B$, and taking it as an example: the forward flow coefficient $K_A$ and the forward calibration coefficient $C_A$ obtained from fitting are shown in Table 1; and the reverse flow coefficient $K_B$ and the reverse calibration coefficient $C_B$ obtained from fitting are shown in Table 2;

In order to more intuitively observe a linear relationship between the flow rate and differential pressure, flow rate curves $Q_A$-sqrt($DP2_A$) and $Q_B$-sqrt($DP2_B$) for forward and reverse bidirectional flows at different openings V are plotted, and results are shown in FIGS. 2 and 3, respectively. It can be seen from FIGS. 2 and 3 that the flow rate has a good linear relationship with sqrt (DP2) no matter whether the agents flow in the forward direction or in the reverse direction.

step 3. fitting relationships between flow coefficients and needle valve openings according to Formula ② based on the forward fitting array and the reverse fitting array;

$$\begin{cases} K_A = f(V_A) = A_A * V_A + D_A \\ K_B = f(V_B) = A_B * V_B + D_B \end{cases}$$

Figure 4:
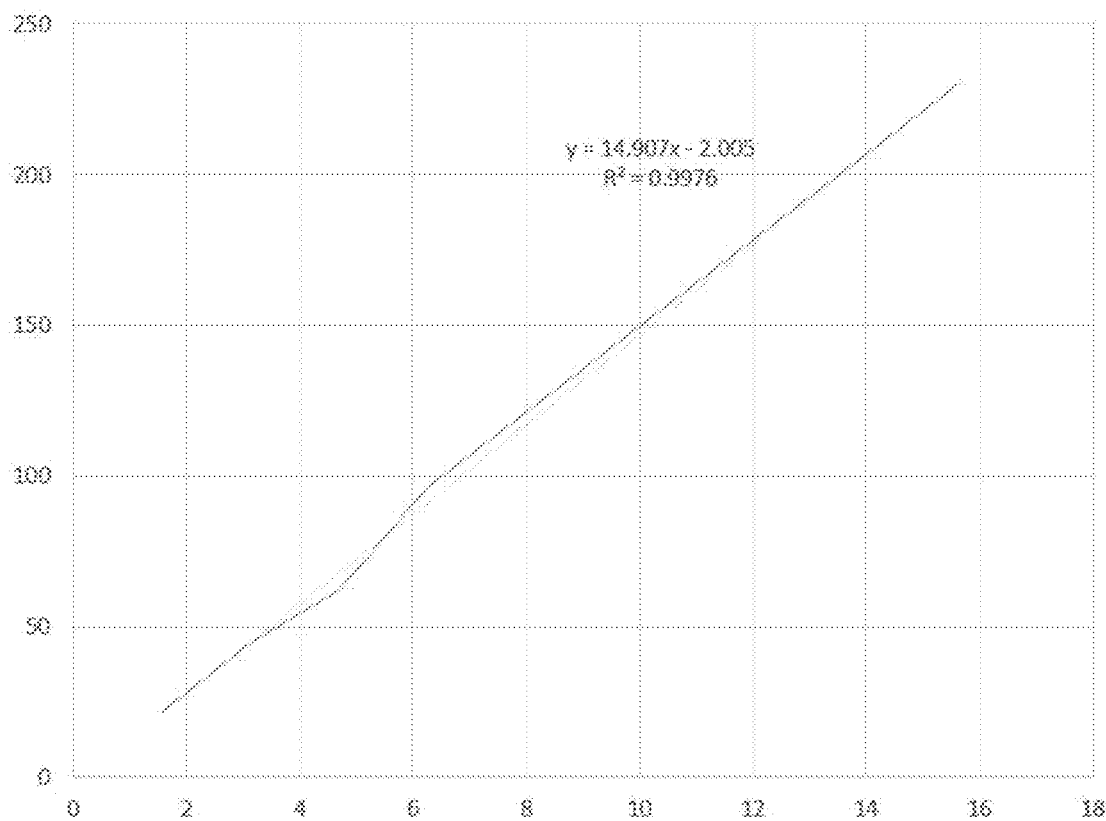
FIG. 4 shows fitting curves between a forward calibrated flow coefficient $K_A$ and an opening $V_A$ according to the present disclosure.
Figure 5:
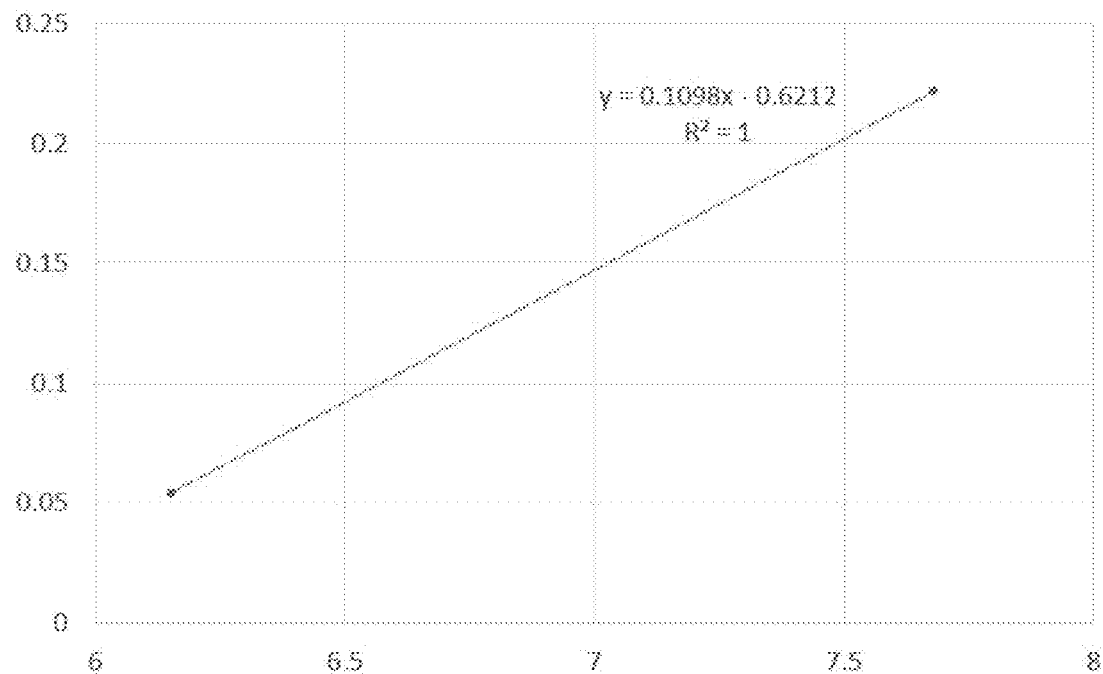
FIG. 5 shows fitting curves between a reverse calibrated flow coefficient $K_B$ and an opening $V_B$ according to the present disclosure.

Formula ② a plurality of $K_{Ai}$ and $V_{Ai}$, and a plurality of $K_{Br}$ and $V_{Br}$ are substituted into Formula 2 for separate fitting to obtain forward opening fitting parameters $A_A$ and $D_A$, as well as reverse opening fitting parameters $A_B$ and $D_B$. Fitting results of $A_A$, $D_A$, $A_B$ and $D_B$ are shown in Tables 1 and 2:

In order to more intuitively observe a linear relationship between the flow coefficient and the opening, K-V curves between the flow coefficient and the opening V in the forward and reverse directions are plotted, and results are shown in FIGS. 4 and 5. It can be seen from FIGS. 4 and 5 that the flow coefficient has a good relationship with the opening when the agent flows in the forward and reverse directions;

therefore, the relationship between the flow rate, the opening, and the differential pressure is obtained, as shown in Formula ③:

$$\begin{cases} Q_A = f(V_A) * \sqrt{DPn_A} + \overline{C_A} = (14.907 * V_A - 2.005) * \sqrt{DP2_A} + \overline{C_A} \\ Q_B = f(V_B) * \sqrt{DPn_B} + \overline{C_B} = (0.1098 * V_B - 0.6212) * \sqrt{DP2_B} + \overline{C_B} \end{cases} \quad \text{Formula (3)}$$

$\overline{C_A}$ is an average of a plurality of forward calibration coefficients $C_A$; and $\overline{C_B}$ is an average of a plurality of reverse calibration coefficients $C_B$.

real-time flow rates $Q1_A'$ and $Q2_A'$; and $Q1_A'$ is the real-time forward flow rate calculated using $DP1_A'$, and $Q2_A'$ is the real-time forward flow rate calculated using $DP2_A'$; and taking the calibration flow rate Q as the actual flow rate to

TABLE 1

Statistics of forward calibration array, fitting array, and some opening fitting parameters

| S/N | $V_A$/ % | $Q_A$ L/h | P1/ Mpa | P2/ Mpa | P3/ Mpa | $DP1_A$/ Mpa | $DP2_A$/ Mpa | $K_A$ | $C_A$ | $A_A$ | $D_A$ |
|---|---|---|---|---|---|---|---|---|---|---|---|
| 1-1 | 6.25 | 152.4 | 6.296 | 2.901 | 0.122 | 3.395 | 2.779 | 44.895 | 6.678 | 14.907 | −2.005 |
| 1-2 | | 141.6 | 5.437 | 2.471 | 0.119 | 2.966 | 2.352 | | | | |
| 1-3 | | 129.6 | 4.652 | 2.128 | 0.117 | 2.524 | 2.011 | | | | |
| 1-4 | | 115.2 | 3.63 | 1.693 | 0.114 | 1.937 | 1.579 | | | | |
| 1-5 | | 104.4 | 3.202 | 1.51 | 0.113 | 1.692 | 1.397 | | | | |
| 2-1 | 3.125 | 92.4 | 6.296 | 0.115 | 4.954 | 1.342 | 4.839 | 96.601 | −8.082 | | |
| 2-2 | | 87.6 | 5.769 | 0.114 | 4.534 | 1.235 | 4.42 | | | | |
| 2-3 | | 82.8 | 5.209 | 0.113 | 4.127 | 1.082 | 4.014 | | | | |
| 2-4 | | 77.4 | 4.657 | 0.112 | 3.731 | 0.926 | 3.619 | | | | |
| 2-5 | | 72.6 | 3.967 | 0.112 | 3.215 | 0.752 | 3.103 | | | | |
| ... | ... | ... | ... | ... | ... | ... | ... | | | | |
| 3-1 | 4.6875 | 30 | 0.583 | 0.454 | 0.106 | 0.129 | 0.348 | 61.938 | −6.428 | | |
| 3-2 | | 45.6 | 1.092 | 0.811 | 0.107 | 0.281 | 0.704 | | | | |
| 3-3 | | 64.2 | 2.035 | 1.435 | 0.109 | 0.6 | 1.326 | | | | |
| 3-4 | | 79.8 | 2.979 | 2.035 | 0.109 | 0.944 | 1.926 | | | | |
| 3-5 | | 92.4 | 3.917 | 2.62 | 0.111 | 1.297 | 2.509 | | | | |
| ... | ... | ... | ... | ... | ... | ... | ... | | | | |
| 4-1 | 15.625 | 189.6 | 6.089 | 0.871 | 0.127 | 5.218 | 0.744 | 22.01 | −7.196 | | |
| 4-2 | | 172.2 | 5.143 | 0.715 | 0.123 | 4.428 | 0.592 | | | | |
| 4-3 | | 156 | 4.165 | 0.577 | 0.121 | 3.588 | 0.456 | | | | |
| 4-4 | | 128.4 | 3.069 | 0.431 | 0.117 | 2.638 | 0.314 | | | | |
| 4-5 | | 93 | 1.953 | 0.306 | 0.114 | 1.647 | 0.192 | | | | |
| ... | ... | ... | ... | ... | ... | ... | ... | | | | |
| 5-1 | 1.5625 | 40.8 | 5.477 | 5.249 | 0.106 | 0.228 | 5.143 | 230.39 | −4.271 | | |
| 5-2 | | 37.8 | 4.122 | 3.876 | 0.106 | 0.246 | 3.77 | | | | |
| 5-3 | | 33 | 3.666 | 3.491 | 0.106 | 0.175 | 3.385 | | | | |
| 5-4 | | 30 | 3.083 | 2.959 | 0.106 | 0.124 | 2.853 | | | | |
| 5-5 | | 25.8 | 2.386 | 2.295 | 0.106 | 0.091 | 2.189 | | | | |
| ... | | ... | ... | ... | ... | ... | ... | | | | |

TABLE 2

Statistics of reverse calibration array, fitting array, and some opening fitting parameters

| S/N | $V_B$/ % | $Q_B$ L/h | P1/ Mpa | P2/ Mpa | P3/ Mpa | $DP1_B$/ Mpa | $DP2_B$/ Mpa | $K_B$ | $C_B$ | $A_B$ | $D_B$ |
|---|---|---|---|---|---|---|---|---|---|---|---|
| 1-1 | 6.1532 | 0.88 | 10.63 | 51.58 | 100.51 | 40.95 | 48.93 | 0.0542 | −0.2492 | 0.1098 | −0.6212 |
| 1-2 | | 1.68 | 11.19 | 170.23 | 305.82 | 159.04 | 135.59 | | | | |
| 1-3 | | 2.04 | 11.44 | 230.58 | 405.38 | 219.14 | 174.79 | | | | |
| 1-4 | | 2.3 | 11.67 | 291.20 | 503.46 | 279.53 | 212.26 | | | | |
| 1-5 | | 2.54 | 11.95 | 356.45 | 611.70 | 344.5 | 255.25 | | | | |
| ... | | ... | ... | ... | ... | ... | ... | | | | |
| 2-1 | 7.6783 | 12.93 | 582.80 | 611.40 | 569.87 | 28.60 | 12.93 | 0.2216 | −0.5443 | | |
| 2-2 | | 12.52 | 486.47 | 511.49 | 473.95 | 25.02 | 12.52 | | | | |
| 2-3 | | 12.09 | 385.31 | 406.24 | 373.22 | 20.92 | 12.09 | | | | |
| 2-4 | | 11.71 | 296.89 | 314.17 | 285.18 | 17.28 | 11.71 | | | | |
| 2-5 | | 10.57 | 34.28 | 37.09 | 23.71 | 2.81 | 10.57 | | | | |
| ... | | ... | ... | ... | ... | ... | ... | | | | |

Step 5. For a more intuitive comparison, making the forward first differential pressure $DP1_A$ and the second differential pressure $DP2_A$ in Table 1 equivalent as the forward real-time first differential pressure $DP1_A'$ and the second differential pressure $DP2_A'$, respectively, substituting them into the corresponding formulae respectively to obtain calculate a percentage error between the real-time flow rate and an actual flow rate.

The results indicate that:
The percentage error between the real-time flow rate $Q1_A'$ and the actual flow rate is (−6.67%)-(+5.19%);

the percentage error between the real-time flow rate $Q2_A'$ and the actual flow rate is (−7.49%)-(+5.84%); and Overall, the use of $DP1_A$, $DP2_A$, $DP1_A'$ and $DP2_A'$ to fit and calculate the real-time flow rates results in relatively small error ranges, and can get accurate results.

Figure 6:
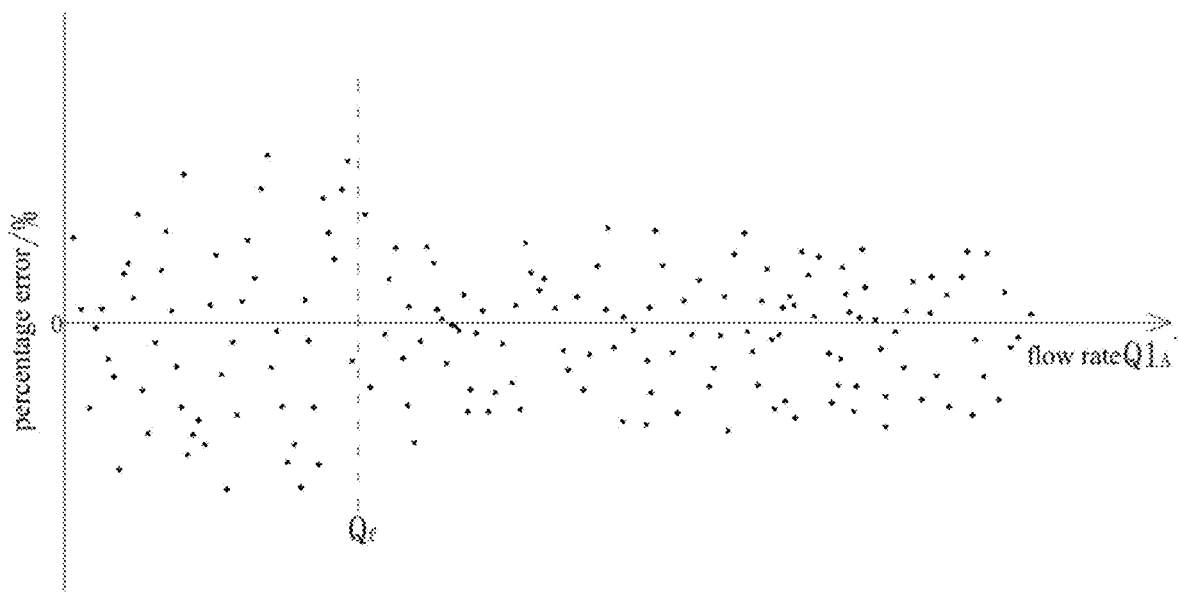
FIG. 6 is a distribution diagram of a percentage error between a flow rate calculated by $DP1_A'$ and an actual flow rate according to the present disclosure.
Figure 7:
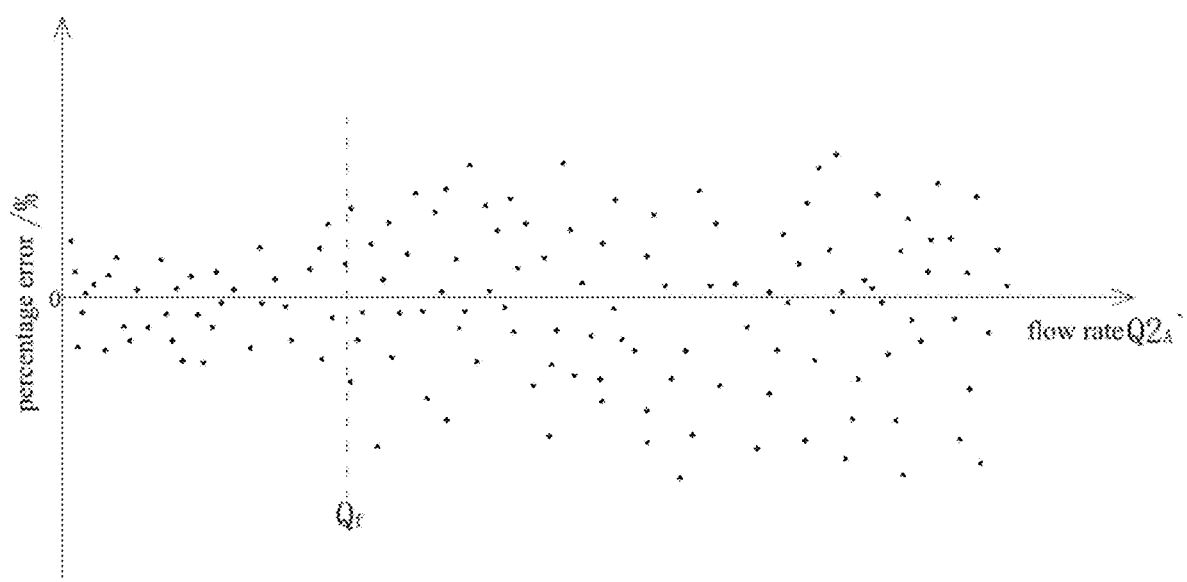
FIG. 7 is a distribution diagram of a percentage error between a flow rate calculated by $DP2_A'$ and an actual flow rate according to the present disclosure.

The relationship between percentage errors and actual flow rates corresponding to $Q1_A'$ and $Q2_A'$ are respectively plotted in coordinate systems, and results are shown in FIGS. 6 and 7.

It can be seen from FIGS. 6 and 7 that:
when the flow rate is large, the percentage errors obtained through fitting and calculation of $DP1_A/DP1_A'$ by using are more concentrated, and the error ranges thereof are relatively small;
while the percentage errors obtained through fitting and calculation of $DP2_A/DP2_A'$ by using are relatively dispersed, and the error ranges thereof are relatively larger; and
when the flow rate is small, the percentage errors obtained through fitting and calculation of $DP2_A/DP2_A'$ by using are more concentrated, and the error ranges thereof are relatively small;
while the percentage errors obtained through fitting and calculation of $DP1_A/DP1_A'$ by using are relatively dispersed, and the error ranges thereof are relatively larger.

Therefore, different fitting and/or calculation methods can be adopted to measure the segmented real-time flow rate according to a magnitude of target flow rate: a key to segmentation is to identify a boundary point between a high flow rate and a lower flow rate; the boundary point is generally set manually according to the calibration results, and the boundary point is the segmented flow rate measurement value $Q_f$.

Therefore, when measuring and controlling the real-time flow, the corresponding differential pressure and flow rate formula can be selected based on the target flow rate $Q_m$ and the segmented flow rate measurement value $Q_f$ to calculate the real-time flow rate, so as to obtain more accurate results, that is, the segmented control as specified in Example 2 can be performed.

Beneficial effects: The technical solution of the present disclosure can detect an installation direction of the subsea agent injection device and accurately measure the flow rates of the forward and reverse bidirectional installation conditions, thereby avoid inaccurate flow measurement results due to inverted installation direction. In addition, the present disclosure simplifies the real-time flow rate measurement process by obtaining only differential pressure and needle valve opening.

Finally, it should be noted that the above description is only the preferred embodiment of the present disclosure. Under the inspiration of the present disclosure, a person of ordinary skill in the art can make various similar representations without departing from the spirit of the present disclosure and the claims, and such changes all fall within the protection scope of the present disclosure.

What is claimed is:

1. A forward and reverse bidirectional flow rate measurement method for a subsea chemical agent injection device, comprising a device body, wherein the device body comprises an agent input connector, a pressure reduction member, a needle valve assembly, and an agent output connector that are sequentially communicated through a flow channel;

step 1: keeping an opening V of the needle valve assembly fixed, taking the agent input connector and the agent output connector as inlets to inject agents with different calibrated flow rates Q into the device body for forward and reverse bidirectional calibration, and synchronously obtaining first differential pressures DP1 before and after a chemical agent flows through the pressure reduction member, and second differential pressures DP2 before and after the chemical agent flows through the needle valve assembly during a period; and obtaining a forward calibration array and a reverse calibration array for the opening V;

step 2: fitting relationships between flow rates and differential pressures in forward and reverse directions at the same opening V according to Formula ①:

$$\begin{cases} Q_A = K_A * \sqrt{DPn_A} + C_A \\ Q_B = K_B * \sqrt{DPn_B} + C_B \end{cases} \quad \text{Formula ①}$$

in the formula:
$Q_A$ is a forward flow rate; $K_A$ is a forward flow coefficient; $C_A$ is a forward calibration coefficient; $DPn_A$ is either $DP1_A$ or $DP2_A$, $DP1_A$ is a forward first differential pressure, and $DP2_A$ is a forward second differential pressure; and
$Q_B$ is a reverse flow rate; $K_B$ is a reverse flow coefficient; $C_B$ is a reverse calibration coefficient; $DPn_B$ is either $DP1_B$ or $DP2_B$, $DP1_B$ is a reverse first differential pressure, and $DP2_B$ is a reverse second differential pressure;

step 3: adjusting the needle valve assembly to different openings V, and repeating the steps 1 and 2 to obtain forward and reverse flow coefficients, as well as forward and reverse calibration coefficients at the different openings V, respectively;
a forward opening $V_A$, the forward flow coefficient $K_A$, and the forward calibration coefficient $C_A$ correspond to each other and form a forward fitting array; and
a reverse opening $V_B$, the reverse flow coefficient $K_B$, and the reverse calibration coefficient $C_B$ correspond to each other and form a reverse fitting array;

step 4: fitting relationships between flow coefficients and needle valve openings according to Formula ②:

$$\begin{cases} K_A = f(V_A) \\ K_B = f(V_B) \end{cases} \quad \text{Formula ②}$$

step 5: establishing a formula of flow rate, opening, and differential pressure according to Formula ③:

$$\begin{cases} Q_A = f(V_A) * \sqrt{DPn_A} + \overline{C_A} \\ Q_B = f(V_B) * \sqrt{DPn_B} + \overline{C_B} \end{cases} \quad \text{Formula ③}$$

in the formula:
$\overline{C_A}$ is an average of a plurality of forward calibration coefficients $C_A$; and
$\overline{C_B}$ is an average of a plurality of reverse calibration coefficients $C_B$;

step 6: connecting the device body to a production system and injecting the chemical agent;
when a pressure of the chemical agent shows a decline trend from the pressure reduction member to the needle valve assembly, the chemical agent is determined to flow in a forward direction; and a real-time forward opening of the needle valve assembly is controlled to $V_A'$, a real-time forward first differential pressure $DP1_A'$ and a real-time forward second differential pressure $DP2_A'$ are obtained, and a real-time forward flow rate $Q_A'$ is then calculated according to Formula ④:

$$Q_A' = f(V_A') * \sqrt{DPN_A' + C_A}, \quad \text{Formula ④};$$

in the formula, $DPn_A'$ is either $DP1_A'$ or $DP2_A'$; and when the pressure of the chemical agent shows an increase trend from the pressure reduction member to the needle valve assembly, the chemical agent is determined to flow in a reverse direction; and a real-time reverse opening of the needle valve assembly is controlled to $V_B'$, a real-time reverse first differential pressure $DP1_B'$ and a real-time reverse second differential pressure $DP2_B'$ are obtained, and a real-time reverse flow rate $Q_B'$ is then calculated according to Formula ⑤:

$$Q_B' = f(V_B') * \sqrt{DPn_B' + C_B}, \quad \text{Formula ⑤}.$$

2. The forward and reverse bidirectional flow rate measurement method for the subsea chemical agent injection device according to claim 1, wherein in the step 4:

$$\begin{cases} K_A = f(V_A) = A_A * V_A + D_A \\ K_B = f(V_B) = A_B * V_B + D_B \end{cases}, \quad \text{Formula ②}$$

in the formula, $A_A$ and $D_A$ are fitting parameters of the forward opening $V_A$, and $A_B$ and $D_B$ are fitting parameters of the reverse opening $V_B$.

3. The forward and reverse bidirectional flow rate measurement method for the subsea chemical agent injection device according to claim 1, wherein in the step 2, a segmented flow rate measurement value $Q_f$ is set;

in the step 6, a target flow rate $Q_m$ is set, and the opening V of the needle valve assembly is controlled to make $Q_A' = Q_m$ or $Q_B = Q_m$;

when $Q_m > Q_f$:

in the step 2, $DPn_A$ is set to $DP1_A$, and in the step 6, $DPn_A'$ is set to $DP1_A''$;

in the step 2, $DPn_B$ is set to $DP1_B$, and in the step 6, $DPn_B'$ is set to $DP1_B'$;

when $Q_m \leq Q_f$:

in the step 2, $DPn_A$ is set to $DP2_A$, and in the step 6, $DPn_A'$ is set to $DP2_A'$; and in the step 2, $DPn_B$ is set to $DP2_B$, and in the step 6, $DPn_B$ is set to $DP2_B''$.

4. The forward and reverse bidirectional flow rate measurement method for the subsea chemical agent injection device according to claim 1, wherein the device body further comprises a first pressure sensor, a second pressure sensor, and a third pressure sensor;

the first pressure sensor is connected to the flow channel at an upstream end of the pressure reduction member to measure a front fluid pressure P1 before the chemical agent flows through the pressure reduction member;

the second pressure sensor is connected to the flow channel between the pressure reduction member and the needle valve assembly to measure a middle fluid pressure P2 after the chemical agent flows through the pressure reduction member but before the chemical agent flows through the needle valve assembly; and the third pressure sensor is connected to the flow channel at a downstream of the needle valve assembly to measure a rear fluid pressure P3 after the chemical agent flows through the needle valve assembly.

5. The forward and reverse bidirectional flow rate measurement method for the subsea chemical agent injection device according to claim 4, wherein in the step 6, when the front fluid pressure P1 is greater than the rear fluid pressure P3, the chemical agent is determined to flow in the forward direction; and when the rear fluid pressure P3 is greater than the front fluid pressure P1, the chemical agent is determined to flow in the reverse direction.

6. The forward and reverse bidirectional flow rate measurement method for the subsea chemical agent injection device according to claim 1, wherein the device body further comprises a linear displacement sensor and a rotational displacement sensor; and sensing terminals of the linear displacement sensor and the rotational displacement sensor are both connected to an opening and closing function portion of the needle valve assembly.

7. The forward and reverse bidirectional flow rate measurement method for the subsea chemical agent injection device according to claim 2, wherein in the step 2, a segmented flow rate measurement value $Q_f$ is set;

in the step 6, a target flow rate $Q_m$ is set, and the opening V of the needle valve assembly is controlled to make $Q_A' = Q_m$ or $Q_B = Q_m$;

when $Q_m > Q_f$:

in the step 2, $DPn_A$ is set to $DP1_A$, and in the step 6, $DPn_A'$ is set to $DP1_A''$;

in the step 2, $DPn_B$ is set to $DP1_B$, and in the step 6, $DPn_B$ is set to $DP1_B'$;

when $Q_m \leq Q_f$:

in the step 2, $DPn_A$ is set to $DP2_A$, and in the step 6, $DPn_A'$ is set to $DP2_A'$; and in the step 2, $DPn_B$ is set to $DP2_B$, and in the step 6, $DPn_B'$ is set to $DP2_B$.

8. The forward and reverse bidirectional flow rate measurement method for the subsea chemical agent injection device according to claim 2, the device body further comprises a first pressure sensor, a second pressure sensor, and a third pressure sensor;

the first pressure sensor is connected to the flow channel at an upstream end of the pressure reduction member to measure a front fluid pressure P1 before the chemical agent flows through the pressure reduction member;

the second pressure sensor is connected to the flow channel between the pressure reduction member and the needle valve assembly to measure a middle fluid pressure P2 after the chemical agent flows through the pressure reduction member but before the chemical agent flows through the needle valve assembly; and the third pressure sensor is connected to the flow channel at a downstream of the needle valve assembly to measure a rear fluid pressure P3 after the chemical agent flows through the needle valve assembly.

9. The forward and reverse bidirectional flow rate measurement method for the subsea chemical agent injection device according to claim 8, wherein in the step 6, when the front fluid pressure P1 is greater than the rear fluid pressure P3, the chemical agent is determined to flow in the forward direction; and when the rear fluid pressure P3 is greater than the front fluid pressure P1, the chemical agent is determined to flow in the reverse direction.

* * * * *